Aug. 5, 1952  G. V. A. DUCH ET AL  2,606,266
METHOD FOR CUTING CABLES, TUBES, BARS, RODS, AND THE LIKE
Filed March 24, 1950  2 SHEETS—SHEET 2
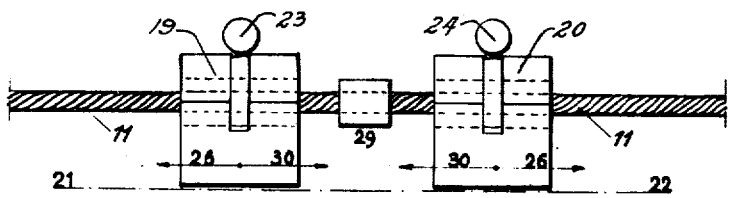
Fig.7
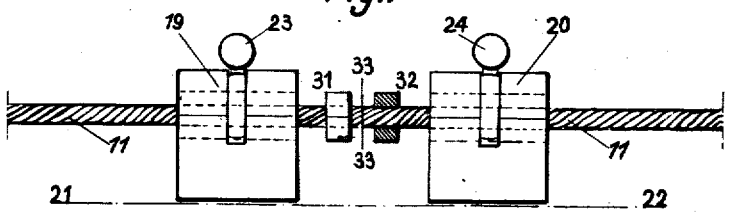
Fig.8
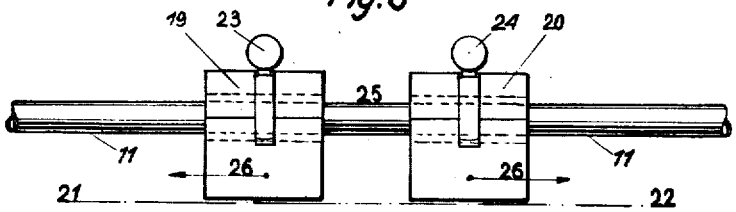
Fig.9
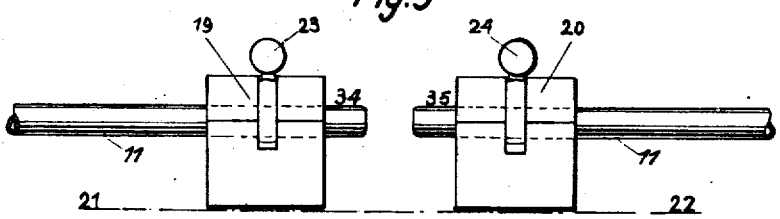
Fig.10
Fig.11
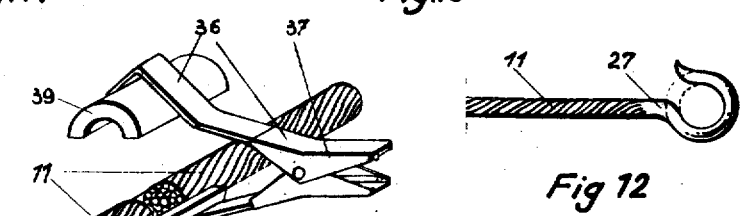
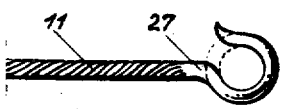
Fig 12
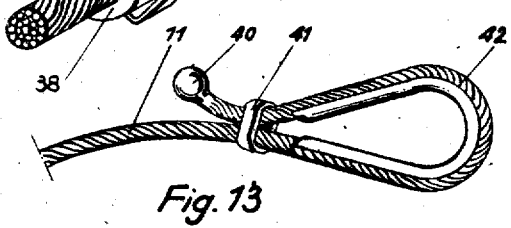
Fig. 13
INVENTORS
GABRIEL V.A. DUCH
MARIE A. DUCH
By
Young, Emery & Thompson
Attys Patented Aug. 5, 1952

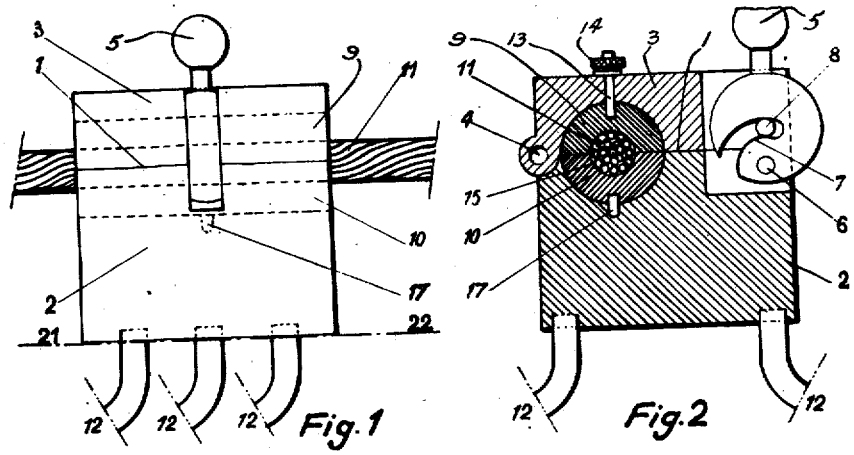
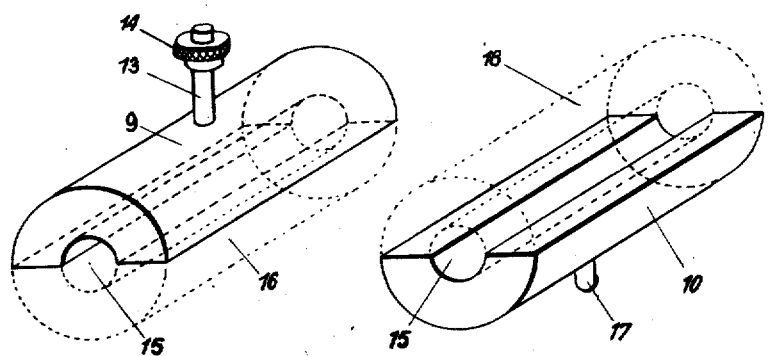
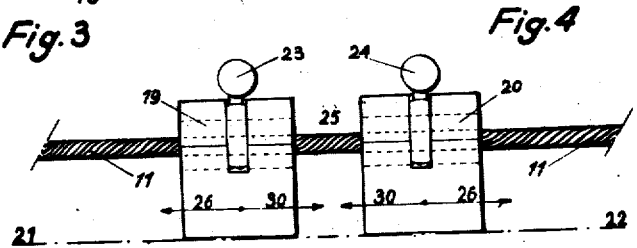
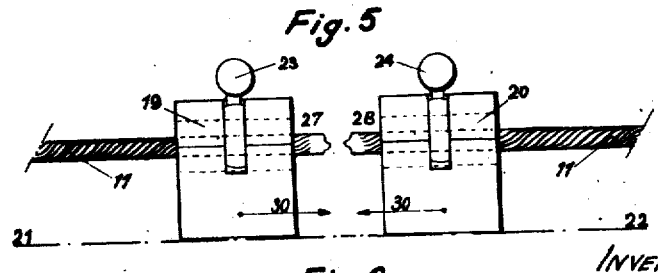

2,606,266

UNITED STATES PATENT OFFICE 2,606,266

METHOD FOR CUTTING CABLES, TUBES, BARS, RODS, AND THE LIKE

Gabriel Victor Alphonse Duch and Marie Adrienne Duch, Lyons, France

Application March 24, 1950, Serial No. 151,634
In France March 29, 1949

4 Claims. (Cl. 219—1)

The present invention relates to the art of cutting off cables, tubes, bars, rods and other metal parts or elements whether plain or solid or stranded by using electric current and taking advantage of the Joule effect.

It is known that the cutting of cables of small diameter is customarily performed without substantial difficulties on butt-welding machines. However when cutting off cables or elongated parts having fairly large diameters or cross sectional areas, for instance of the order of four millimeters or more, the disadvantage is found that where clamping jaws are used for holding the cable in cutting condition, said jaws glow red so that the cutting becomes irregular and the resultant cable lengths cannot be properly used for many industrial purposes.

It is an object of this invention to remedy the aforesaid disadvantage by the provision of a novel or improved method for electrically cutting off cables, tubes, bars or like parts made partly, mostly or entirely of metal or alloy while obtaining a clean cut sectional line and without unduly heating the cable or other part adjacent the jaws in which it is held and clamped.

Another object of the invention is to provide a method as aforesaid particularly applicable to cables, i. e. to parts composed of a plurality of strands (whether entirely or partly made of metal, the rest of the strands being made of any textile or non-metallic material) and permitting the strands to be coalesced incidental to the cutting operation due to the formation of beads or sprue heads which gather the metal into such bunches as will interconnect said strands to proper firmness.

A further object of the invention is to provide a method as aforesaid permitting the resultant sprue heads formed at the ends of the cable or part lengths resulting from its breaking asunder, when the jaws are pulled apart outwardly, to be used for securing to said lengths extraneous elements such as hooks, snap hooks, slips, yoke members or the like, thereby permitting such cable lengths to be used for miscellaneous purposes in the industry for interconnection with other parts used in the electrical, building, mechanical or in other trades.

With these and such other objects in view as will incidentally appear hereafter, the invention comprises the novel combination of steps which are essential to the aforesaid method.

In order to facilitate an understanding of the invention, reference is made to the drawings in which:

Figure 1 is an elevational view of a cable-encompassing and contacting jaw utilisable in carrying out the invention.

Figure 2 is a transverse sectional view of the jaw shown in Fig. 1, the cable being shown encompassed thereby.

Figures 3 and 4 are perspective views of interchangeable semi-cylindrical bushings utilisable in contact jaws according to the invention.

Figures 5 and 6 are views showing a cable in two successive stages of the operation of cutting the same asunder according to the invention.

Figure 7 is a view similar to Figs. 5 and 6 showing the use of a pressure or forcing sleeve.

Figure 8 is another view similar to Figs. 5 and 6 showing the use of a pair of forcing or pressure sleeves.

Figures 9 and 10 are views similar to Figs. 5 to 8 showing a tubular member during two consecutive stages of the operation of cutting the same according to the invention.

Figure 11 is a perspective view showing a supporting clamp for a pressure or forcing sleeve.

Figures 12 and 13 are views illustrating two different ways of using the bead or sprue head which forms on the end of a cable length for shaping a hook and a ball or knob respectively.

Referring first to Figs. 1 and 2, it will be seen that the jaw 1 which is formed of a solid block of a metal or alloy chosen because of its electrical conductivity comprises a base element 2 and a removable cover element 3 mounted for rocking motion about a pivotal pin 4. A clamping lever carrying a knob 5 is mounted for rocking motion about a pin 6 fixed in the base element 2. This lever has an arcuate notch 7 in the shape of an offset ramp into which is received a transverse stud 8 operatively connected to the cover element 3. This construction permits the cover element to be brought toward and clamped against the base element 2 of the jaw 1. This clamping device may vary in structure.

The semi-cylindrical bushings 9 and 10 shown in Figs. 3 and 4 are accommodated in semi-cylindrical recesses of equivalent size formed in the jaw elements 2 and 3 and clamp over the entire length of their inner curvature the cable 11 the strands of which are shown in edge view in Fig. 2 by small clustered circles. The terminals for the input of the electric current of high intensity to the clamping device are formed by flexible leads 12 of adequate cross section.

Figs. 3 and 4 diagrammatically illustrate the upper and lower semi-cylindrical bushings 9 and 10. The upper bushing 9 (Fig. 3) carries a screw-threaded rod 13 upon which is engaged a knurled nut 14 which secures it to the cover element 3 of the jaw 1. A longitudinal axial bore 15 permits the cable to be set into position and clamped, the cross sectional size of this cable being slightly larger than the diameter of the bore 15. The dotted line structure 16 designates that portion of the bushing 9 which has been removed to provide the recess. In Fig. 4 is likewise illustrated the lower semi-cylindrical bushing 10 which in the jaw forms the counterpart of the upper bushing 9. The lower bushing 10 is held in position by its own weight and by adhesion in the semi-cylindrical recess formed in the base element 2 of the jaw. A stud 17 received in a corresponding hole in the base element 2 of the jaw (see Figs. 1 and 2) prevents the bushing 10 from moving while the pressure or forcing stresses and the separating stresses are exerted during manipulations of the device.

The dotted line structure 18 shows that portion of the bushing 10 which has been removed to provide the recess. The longitudinal bore 15 is also shown like the one in the bushing 9.

The semi-cylindrical shape of the bushings 9, 10 along their periphery and the identical shape of the recesses provided for accommodating them in the base element 2 and cover element 3 of the jaw 1 are given by way of examples. Any other shape such as a polygonal shape might be used without departing from the invention.

It will be noted that the length of the recesses 15 in the bushings 9, 10 is considerable with respect to their cross sectional size. This is intended to improve as much as possible the contacting surface of the cable 11 against each jaw. As each jaw is made up of a pair of superimposed elements as shown, the set of semi-cylindrical bushings of equal volume for the two companion jaws therefore comprises four bushings, namely a pair of upper bushings 9 and a pair of lower bushings 10. It is easy to conceive that it is desirable to provide a series of like bushings having a size differing by millimeters and enabling the operator to select the one which exactly matches a cable of given cross sectional size provided the ramp 7 on the clamping lever having the knob 5 permits the cover element 3 to raise off the base element 2 by one millimeter or more.

In Fig. 5 are diagrammatically illustrated companion jaws 19 and 20 similar to the typical jaw 1 shown in Figs. 1 and 2 of the cable-cutting device adapted to cut off cables when in operative position. The jaws are displaceable translationally along the dot and dash axis 21—22. The cable 11 engaged through the cooperative bushings of each jaw is clamped by means of levers having knobs 23, 24.

When causing a current of high intensity fed by flexible leads (not shown) to flow through the jaws 19 and 20 that portion 25 of the cable 11 which extends in the cutting zone between the jaws glows red and then melts in its middle portion. If a forcing stress (inwardly) and then a separating stress (outwardly) are exerted on the companion jaws in the directions respectively indicated by the arrows 30 and 26, the cable is cut off approximately midway of its length, i. e. in the region shown at 25. This only requires a minimum effort. The cable strands are coalesced by a capillary flow of the molten metal.

In Fig. 6 is illustrated the jaws and the cut off cable at the completion of the process. The free ends 27, 28 of the cable lengths each carry a sprue head made of molten metal which welds together the strands of the cable and to which may be instantly butt-welded either a hook or a ring or any other form of slip or clasp by using the sprue head 27 or 28 as basic metal for the welding process. Alternatively the ends 27, 28 of the cable lengths may be conveniently machined or prepared for being screw-threaded.

In the showing of Fig. 7 is illustrated the arrangement which will be used when utilizing a refractory sleeve or a pair of refractory sleeves sheathing or encompassing the inter-jaw portion of the cable 11 as shown at 29. As the inter-jaw or intermediate portion of the cable has been softened and molten, the forcing stress should be exerted in the inward direction shown by the arrows 30 by moving the jaws 19 and 20 together axially so as to bring and dam the molten metal into the sleeve 29. A subsequent separating stress axially in the outward direction shown by the arrows 26 then permits the cable to be cut asunder. After being removed from the sleeve 29 or the companion sleeves 31, 32 the cable lengths have the appearance shown in Fig. 6.

In Fig. 8 is represented a modification of the last-cited process, assuming the cutting operation to be carried out by means of two refractory sleeves or four like half sleeves 31, 32 juxtaposed along their bases as shown at 33 i. e. along the approximate location of the desired cutting of the cable. The cutting operation is effected as in the case of Fig. 7. When the cutting operation is completed and the sleeves or half sleeves 31, 32 have been taken off, the cable lengths have the appearance shown in Fig. 6.

In Fig. 9 is represented the arrangement of tubes or bars 11 in the jaws 19, 20 the cutting of the tubes or bars in the region 25 comprised between the jaws. The tube or bar 11 positioned in properly mated bushings accommodated in the jaws 19, 20 and clamped by means of levers having knobs 23, 24 is heated by causing an electric current to flow therethrough. As the intermediate portion 25 of the tube or bar 11 glows red, a prolonged separating stress is exerted upon the jaws 23 and 24 in the outward direction shown by the arrow 26 until the tube or bar is broken adjacent the middle of the length of its intermediate portion 25.

In Fig. 10 is represented the appearance of the severed ends of the tube or bar 11 after the cutting off operation. 34 and 35 illustrate the shrinkage of the cut ends after this cutting operation.

Electrical butt-welding of cable elements so as to build up larger cable lengths may be effected. The severed ends of the cable lengths are shown in Fig. 6 at 27 and 28. By exerting a forcing stress in the inward direction shown by the arrow 30, while the ends 27 and 28 are in contact, whether they are covered by a sleeve or by half sleeves (not shown) the cable elements may be instantaneously connected together.

In Fig. 11 is illustrated a form of a clamp 36 adapted to hold in position the two halves of a sleeve while the cable 11 is cut off. The clamp the operation of which is somewhat similar to that of a clothes pin is shown in its open position, the spring 37 urging the same into closed position and the half sleeves 38 and 39 toward each other to encompass the cable 11.

In Fig. 12 is illustrated a hook welded at its end to the extremity of a cable length 11 which has been obtained by cutting off a cable by the present method while using the end sprue head 27 as a firm securing base for the hook.

Similarly there may be secured instead of the hook and by the same method i. e. by butt-welding and while using the sprue head 27 a ring member, a swivel hook, a snap hook, a ball, a yoke member, a screw-threaded rod, etc.

In Fig. 13 is illustrated a buckle member with a lining for the end of the cable. The possibility is offered according to the invention to provide on the end of a cable length such as 11 (whether it comprises textile strands or no textile strands) a sliding buckle by butt-welding a stop member (shown here non-limitatively as a ball 40) adapted to retain the cable end against the edge of a slider 41 which may be a ring member, a sleeve, a hook, a yoke member, a clamp or the like. If desired, the end buckle fitted to the cable length may be reinforced by a thimble or lining member such as 42 adapted at the same time to restrict its size.

Minor constructional details may be varied so as to suit practical requirements without departing from the scope of the subjoined claims.

What is claimed is:

1. A method of electrically cutting off cables, tubes, bars or similar elongated metal parts having metal and textile strands within the range of a set cutting zone comprising the steps of tightly applying upon the part to be cut and on both sides of the cutting zone encompassing jaws having a sufficient contact surface to permit the flow therethrough of an electric current of adequate intensity for melting the zone where the part is to be cut, causing an intense current to flow through said jaws, slightly bringing together the jaws while the metal melts to force and bunch the molten metal, and moving the jaws apart so as to cut asunder the molten part.

2. A method of electrically cutting off cables or similar stranded metal parts having metal and textile strands within the boundaries of a cutting zone comprising the steps of tightly applying encompassing jaws upon the part to be cut on the opposite sides of the cutting zone, said jaws having a sufficient contact surface for permitting an electric current of sufficient intensity to melt said part, causing a current of high intensity to flow from one jaw to the other, bringing the jaws together while the melting takes place to a sufficient extent to force and bunch the molten metal while coalescing by a capillary flow of the molten metal the cable strands and while forming a sprue head, and moving the jaws from each other so as to cut the cable asunder into two lengths each of which terminates in a sprue head.

3. A method of electrically cutting off cables or similar metal parts having metal and textile strands within the range of a cutting zone comprising the steps of tightly encompassing the cable to be cut on both sides of said zone by tightly applied jaws having a sufficient contact area to permit the flow of an electric current of sufficient intensity to melt the part where the cut has to take place, sheathing the cutting zone by means of at least one refractory sleeve providing a small clearance for the cable, causing a current of high intensity to flow between said jaws, bringing the jaws together while the metal melts so as to force and bunch the molten metal into the sleeve for forming in said sleeve a sprue head capable of interconnecting by coalescence the cable strands, and moving the jaws off each other by a sudden outward motion so as to cut the cable asunder into a pair of lengths each of which terminates in a sprue head.

4. A method of electrically cutting off cables or similar metal parts having metal and textile strands inside the range of a cutting zone comprising the steps of tightly applying upon the cable to be cut off on the opposite sides of said zone encompassing jaws having a contact area of sufficient extent to permit the flow of an electric current of sufficient intensity to melt the cable metal, causing such an intense current to flow between the jaws, bringing together said jaws as the cable metal melts so as to force and bunch the molten metal and coalesce together the cable strands owing to the sprue head resulting from the bunching, then suddenly moving the jaws apart from each other so as to break the cable asunder through said zone into a pair of lengths each of which terminates in said sprue head, said sprue head being utilisable for welding an extraneous element to said cable length.

GABRIEL VICTOR ALPHONSE DUCH.
MARIE ADRIENNE DUCH.

REFERENCES CITED

The following references are of record in the file of this patent:

UNITED STATES PATENTS

| Number | Name | Date |
| --- | --- | --- |
| 347,141 | Thomson | Aug. 10, 1886 |
| 396,014 | Thomson | Jan. 8, 1889 |
| 432,630 | Lemp | July 22, 1890 |
| 1,259,275 | Murray | Mar. 12, 1918 |
| 1,339,417 | Pierce | May 11, 1920 |
| 1,933,444 | Moreira | Oct. 31, 1933 |
| 1,984,783 | Burd | Dec. 18, 1934 |
| 2,009,206 | Rosner | July 23, 1935 |
| 2,195,775 | Gaspar | Apr. 2, 1940 |
| 2,202,580 | Hahn | May 28, 1940 |